US012531360B2

(12) United States Patent
Laprise

(10) Patent No.: US 12,531,360 B2
(45) Date of Patent: Jan. 20, 2026

(54) MAGNETICALLY LATCHING CONNECTOR

(71) Applicant: Microsoft Technology Licensing, LLC, Redmond, WA (US)

(72) Inventor: Ryan Alain Laprise, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 401 days.

(21) Appl. No.: 18/055,344

(22) Filed: Nov. 14, 2022

(65) Prior Publication Data

US 2024/0162642 A1 May 16, 2024

(51) Int. Cl.

*H01R 13/03* (2006.01)
*H01R 13/20* (2006.01)
*H01R 13/52* (2006.01)

(52) U.S. Cl.

CPC ............. *H01R 13/03* (2013.01); *H01R 13/20* (2013.01); *H01R 13/5219* (2013.01)

(58) Field of Classification Search

None
See application file for complete search history.

(56) References Cited

U.S. PATENT DOCUMENTS 4,242,778 A * 1/1981 Kay .................... H01R 13/631 24/643
5,344,331 A 9/1994 Hoffman et al.
5,367,891 A 11/1994 Furuyama
5,921,787 A 7/1999 Pope et al.
8,434,201 B2 * 5/2013 Wang .................. A44C 5/2076 24/537
9,876,310 B2 1/2018 Hashiguchi
10,202,790 B2 2/2019 Fiedler
11,639,787 B2 * 5/2023 Lee .................... H01R 13/6205 439/537
2009/0111287 A1 4/2009 Lindberg
2009/0291570 A1 11/2009 Wadsworth
2013/0096602 A1 4/2013 Kumar
2017/0317446 A1 * 11/2017 Byrne .................. H01R 24/005

(Continued)

FOREIGN PATENT DOCUMENTS

CN 110718810 A 1/2020
CN 112701526 A 4/2021

OTHER PUBLICATIONS

DZUS® Quarter-Turn Fasteners, https://southco.com/en_us_int/fasteners/emdzusemreg-quarter-turn-fasteners, accessed Nov. 14, 22.

(Continued)

*Primary Examiner* — Renee S Luebke
(74) *Attorney, Agent, or Firm* — Holzer Patel Drennan

(57) ABSTRACT

The presently disclosed technology adopts magnets to provide an over-centre effect to a turn-lock fastener. This can provide smoother fastening/unfastening action and a simplified design to achieve a similar over-centre effect to traditional turn-lock fasteners. Further, a turn-lock connector may be made by incorporating aspects of a turn-lock fastener into matching second and first connector parts that may be selectively latched and unlatched from one another. By creating a magnetic biasing feature within a turn-lock connector, a unique and technically advantageous magnetically latching connector is created.

18 Claims, 5 Drawing Sheets

(56) References Cited

U.S. PATENT DOCUMENTS

| | | | | |
|---|---|---|---|---|
| 2021/0003270 | A1 | 1/2021 | Lee | |
| 2024/0162642 | A1* | 5/2024 | Laprise | H01R 13/5219 |

OTHER PUBLICATIONS

International Search Report and Written Opinion received for PCT Application No. PCT/US2023/033776, Jan. 15, 2024, 15 pages.

International preliminary report on patentability Received in European Patent Application No. PCT/US2023/033776, mailed on May 22, 2025, 10 pages.

* cited by examiner

MAGNETICALLY LATCHING CONNECTOR

BACKGROUND

Turn-lock fasteners (also referred to Dzus or quick-action panel fasteners) are fasteners that utilize a partial turn to secure two or more parts together. For example, a quarter-turn spiral cam lock fastener is often used to secure skin panels on aircraft and other high-performance vehicles. Turn-lock fasteners are also used to secure various plates, doors, and panels that require frequent removal for inspection and servicing.

SUMMARY

Implementations described and claimed herein provide a magnetically latching connector comprising a first part and a second part. The first part includes a cylindrical recess, the cylindrical recess including a catch projecting into the cylindrical recess, and a recess magnet fixed in position at a base of the cylindrical recess. The second part includes a cylindrical protrusion to selectively slip fit inside of the cylindrical recess. The cylindrical protrusion includes a barb, the barb to engage the catch in a latched configuration of the second part with reference to the first part, and the barb to disengage the catch in unlatched configuration of the second part with reference to the first part, and a protrusion magnet fixed in position within the cylindrical protrusion. The latched configuration aligns opposing poles of the recess magnet and the protrusion magnet. The unlatched configuration misaligns the opposing poles of the recess magnet and the protrusion magnet.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Figure 1:
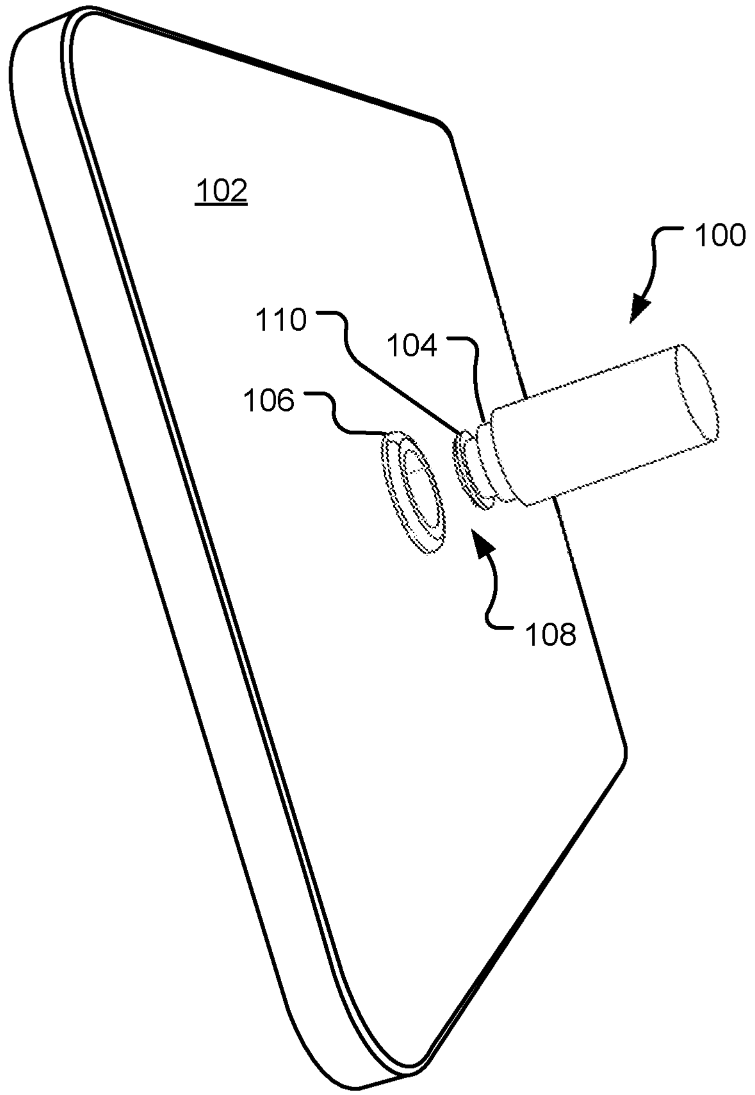
FIG. 1 illustrates an example computing device with an accessory removably attached using an example magnetically latching connector.

Some turn-lock fasteners adopt an "over-centre" design, thus requiring positive sustained torque to fasten and unfasten. Such a design allows minor disturbances to the fastener (e.g., vibration) to self-correct rather than loosen the fastener, as would tend to be the case with a threaded fastener. In many applications, turn-lock fasteners are advantageous over other types of fasteners due to their compact size, over-centre design (which yields a positive bias to fastened and unfastened orientations, and positive tactile feedback of the same to the user), and ability to reliably withstand a large number of fasten and unfasten cycles. Some or all of the features of turn-lock fasteners may also be useful in other types of mechanical connectors.

Traditional turn-lock fasteners also suffer from some disadvantages over other types of fasteners. For example, most turn-lock fasteners that adopt an over-centre design require a significant magnitude of torque to fasten and unfasten the turn-lock fasteners. This may be more torque than is desired in delicate applications or applications were the user-experience is hindered by requiring significant torque to fasten and unfasten the turn-lock fastener (e.g., 20-30 Nm). Further, by requiring a significant magnitude of torque to fasten and unfasten, the traditional turn-lock fastener's physical size must be sufficiently large and robust enough to withstand numerous applications of such torque (e.g., most applications of traditional turn-lock fastener with an over-centre design are 15 mm or greater in diameter). In small and/or delicate applications, smaller fastener sizes may be desired or required (e.g., less than 10 mm). Smaller possible fastener sizes for the presently disclosed latching connectors may be technically advantageous in that the presently disclosed latching connectors may be applied to devices where larger connectors may not physically fit or they may be physically too large to be practical.

Still further, traditional turn-lock fasteners often require a tool, such as a screwdriver to fasten and unfasten them. Requiring a separate tool, and a tool that requires precise alignment with the traditional turn-lock fastener, may be undesirable in applications where the turn-lock fasteners is expected to be quickly and easily fastened and unfastened, without use of a separate tool, without specific user training, and without a user necessarily viewing the turn-lock fastener while fastening and unfastening it. Finally, traditional turn-lock fasteners that adopt an over-centre design often utilize a spring-loaded cam design to achieve the over-centre effect. This adds mechanical complexity and potential points of failure to the traditional turn-lock fastener.

The presently disclosed technology adopts magnets to provide the foregoing over-centre effect. This can provide smoother fastening/unfastening action and a simplified design to achieve a similar over-centre effect. Further, a turn-lock connector may be made by incorporating aspects of a turn-lock fastener into matching second and first connector parts that may be selectively latched and unlatched from one another. By combining the foregoing magnetic biasing feature within a turn-lock connector, a unique and technically advantageous magnetically latching connector is created. The presently disclosed magnetically latching connectors incorporate many of the advantageous of traditional turn-lock fasteners, with fewer or none of the disadvantages, and packages the innovation into a unique mechanical connector. As compared to traditional connectors used to connect a device to an accessory, the presently disclosed technology may further achieve one or more of: improved tactility, reduced rattle, improved impact survival, improved water and/or dust ingress protection, simplified user operation, lower space utilization, and cost reduction.

FIG. 1 illustrates an example mobile computing device 102 with an accessory 100 removably attached using an example magnetically latching connector 108. The latching connector 108 is illustrated in an unlatched and separated configuration (see also FIG. 2A). By inserting second part 104 (e.g., a male part) into first part 106 (e.g., a female part), the latching connector 108 is placed and secured in a latched configuration (see also FIG. 2B). The mobile computing device 102 is illustrated as a mobile phone or tablet computer and the accessory 100 is depicted as a removable handle that may be selectively attached to the mobile computing device 102 via the second and first parts 104, 106 of the latching connector 108.

In various implementations, the mobile computing device 102 may be any sort of computing device (e.g., a tablet computer, laptop computer, personal computer, gaming device, smart phone, or any other discrete device that receives physical user inputs and carries out one or more sets of arithmetic and/or logical operations), an input device for a computing device (e.g., a handheld controller, keyboard, trackpad, or mouse), or a device that is not necessarily related to computing at all (e.g., a vehicle (e.g., automobiles, watercraft, and aircraft), consumer electronics (e.g., cameras, telephones, and home appliances), medical devices, and industrial or commercial machinery). Similarly, the accessory 100 may be any sort of accessory providing functionality beyond that of a handle (e.g., a camera, input device, kickstand, keyboard, protective cover, and so on) that is to be selectively attached to the mobile computing device 102 via the latching connector 108. As a result, the mobile computing device 102 and associated accessory 100 may each be any size and shape appropriate for their respective intended use cases.

As noted above, the connector 108 is made up of a second part 104 protruding from the accessory 100 and a first part 106 formed within the mobile computing device 102. The first part 106 includes a cylindrical recess with a catch (not shown, see e.g., catch 216 of FIGS. 2A and 2B) projecting into the cylindrical recess. A recess magnet (also not shown, see e.g., recess magnet 220 of FIGS. 2A and 2B) is fixed in position at a base of the cylindrical recess to provide the aforementioned over-centre effect using magnetic bias, as discussed in further detail below. The second part 104 includes a cylindrical protrusion to selectively slip fit inside of the cylindrical recess. This slip-fit connection of matching cylindrical parts has a technical benefit of allowing the second part 104 to securely fit to the first part 106, while still permitting rotation of the second part 104 with reference to the first part 106 for latching/unlatching operations. The cylindrical protrusion includes a barb 110 that engages the catch in a latched configuration when the second part 104 is inserted into first part 106. The barb 110 disengages the catch in an unlatched configuration where second part 104 is free to be withdrawn from the first part 106.

Protrusion magnets (not shown, see e.g., protrusion magnet 222, 224 of FIGS. 2A and 2B) are fixed in position within the cylindrical protrusion and have pole orientations that pull the catch toward the barb 110 in the latched configuration and push the catch away from the barb 110 in the unlatched configuration, thereby selectively latching and unlatching the second part 104 from the first part 106 based on the orientation of the second part 104 with reference to the first part 106.

Figure 2A:
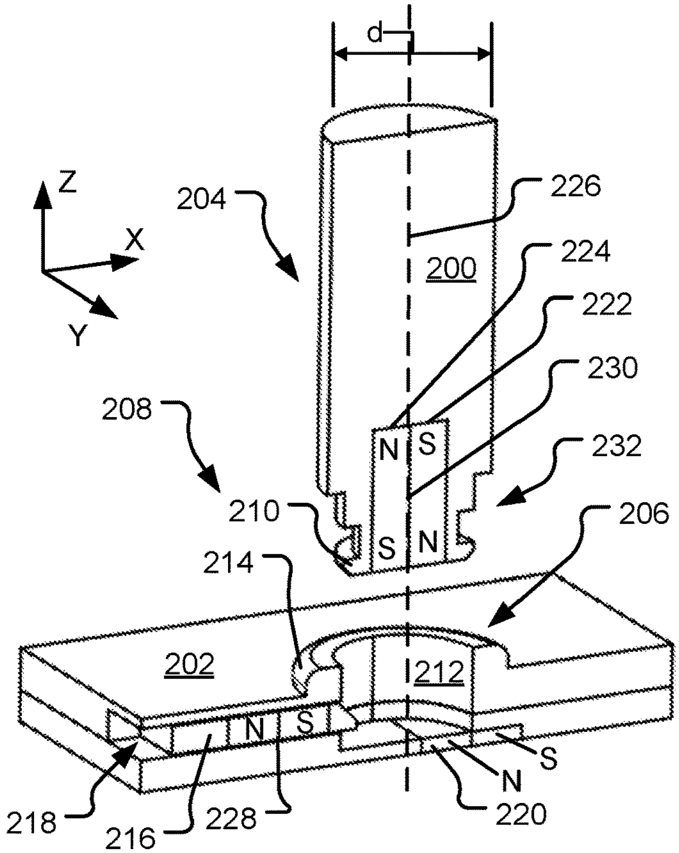
FIG. 2A illustrates a perspective sectional view of an example flat magnetically latching connector in an unlatched configuration.
Figure 2B:
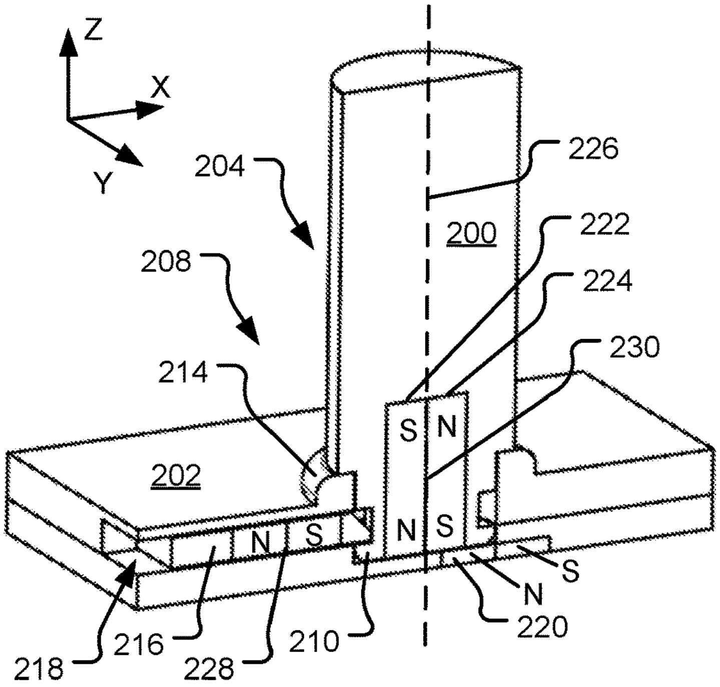
FIG. 2B illustrates a perspective sectional view of the latching connector of FIG. 2A in a latched configuration.

FIG. 2A illustrates a perspective sectional view of an example flat magnetically latching connector 208 in an unlatched configuration. FIG. 2B illustrates a perspective sectional view of the latching connector 208 of FIG. 2A in a latched configuration. The latching connector 208 is illustrated in an unlatched and separated configuration in FIG. 2A. By inserting second part 204 (e.g., a male part) into first part 206 (e.g., a female part), the latching connector 208 is placed and secured in the latched configuration of FIG. 2B. The first part 206 is a partial view of a device 202, such as a mobile computing device or other type of device, as discussed above with reference to mobile computing device 102 of FIG. 1. The second part 204 protrudes from accessory 200, such as a handle or other accessory, as discussed above with reference to accessory 100 of FIG. 1. The accessory 200 is selectively attached to the device 202 via the second and first parts 204, 206 of the latching connector 208. XYZ coordinates are provided in FIGS. 2A and 2B to aid the detailed description, but do not limit the scope of the presently disclosed technology.

As noted above, the connector 208 is made up of a second part 204 protruding from the accessory 200 and a first part 206 formed within the device 202. The first part 206 includes a cylindrical recess 212 surrounded by a reinforcing boss 214 that resists the second part 204 from becoming inadvertently dislodged from the first part 206 by mere application of force. The first part 206 includes a retractable catch 216 that is illustrated as a rectangular prism with a beveled end that selectively protrudes into the cylindrical recess 212. The catch 216 resides within a rectangular recess 218 in the first part 206 and is allowed to move freely within the rectangular recess 218 in the x-direction, though a stop may be implemented limits its protrusion into the cylindrical recess 212 to that shown in FIGS. 2A and 2B.

A recess magnet 220 is fixed in position at a base of the cylindrical recess to provide the aforementioned over-centre effect using magnetic bias, as discussed in further detail below. The second part 204 includes a cylindrical protrusion 232 that selectively slip fits inside of the cylindrical recess 212. The cylindrical protrusion 232 includes a barb 210 extending circumferentially around a distal end of the cylindrical protrusion 232 that engages the catch 216 in the latched configuration of FIG. 2B when the second part 204 is inserted into first part 206. The barb 210 disengages the catch 216 in an unlatched configuration where second part 204 is free to be withdrawn from the first part 206.

Protrusion magnets 222, 224 are arranged side-by-side and fixed in position within the cylindrical protrusion 232. Protrusion magnet 224 and recess magnet 220 each have a north-south polarity as depicted, wherein the south pole of the protrusion magnet 224 attracts the north pole of the recess magnet 220 at the depicted rotational orientation of the second part 204 with reference to the first part 206 about axis 226 running in the z-direction of FIG. 2B. This rotational orientation pulls the second part 204 inward to seat within the first part 206 and provides a sustained force to hold that position, yielding a bias toward the latched configuration specifically shown in FIG. 2B.

If the second part 204 is rotated 180-degrees about the axis 226 from the depicted rotational orientation of FIG. 2B (yielding the orientation of FIG. 2A), the north pole of the protrusion magnet 222 repels the north pole of the recess magnet 220. This rotational orientation pushes the second part 204 outward from the first part 206 and provides a sustained force to resist seating the second part 204 within the first part 206, yielding a bias toward the unlatched configuration specifically shown in FIG. 2A.

The protrusion magnets 222, 224 may each have a rectangular, circular, or semi-circular cross-section shape in the x-y plane. In some implementations, only one of the protrusion magnets 222, 224 is included within the cylindrical protrusion 232 if only one of a bias toward an unlatched or latched configuration, respectively, is desired.

The catch 216 further includes a catch magnet 228 with a north-south polarity as depicted, wherein the south pole of the catch 216 attracts the north pole of the protrusion magnet 222 at the depicted rotational orientation of the second part 204 with reference to the first part 206 about axis 226 running in the z-direction of FIG. 2B. This rotational orientation pulls the catch 216 into the cylindrical recess 212 to seat against the barb 210 provides a sustained force to hold that position, yielding a bias toward the latched configuration specifically shown in FIG. 2B. The barb 210 seated against the catch 216 prevents the second part 204 from being withdrawn from the first part 206 absent rotation of the second part 204 with reference to the first part 206.

If the second part 204 is rotated 180-degrees about the axis 226 from the depicted rotational orientation of FIG. 2B (yielding the orientation of FIG. 2A), the south pole of the protrusion magnet 224 repels the south pole of the catch magnet 228. This rotational orientation pushes the catch 216 out of the cylindrical recess 212 thereby unseating the catch 216 from the barb 210 and provides a sustained force to hold the catch 216 out of the cylindrical recess 212 so long at the second part 204 remains within the first part 206. In other implementations, a second catch and associated catch magnet is included within the first part 206 on the side opposing the catch 216 and the associated catch magnet 228 and functioning substantially the same as the catch 216 and the associated catch magnet 228. Third, fourth, etc. catches and associated catch magnets may also be included.

A combination of the protrusion magnets 222, 224, the recess magnet 220, and the catch magnet 228, and their respective polarities, pulls the second part 204 into the cylindrical recess 212 and pulls the catch 216 toward the barb 210 in the latched configuration of FIG. 2B and pushes the second part 204 out of the cylindrical recess 212 and the catch 216 away from the barb 210 in the unlatched configuration of FIG. 2A. This allows the accessory 200 to be selectively attached to the device 202 based on the orientation of the second part 204 with reference to the first part 206.

As magnets naturally bias to an orientation where opposing poles are pulled together, the accessory 200 is biased to achieve and hold the latched configuration of FIG. 2B when accessory 200 is brought in close proximity to the cylindrical recess 212 (thus, no user application of torque is required to achieve and hold the latched configuration). Absent user input, the latched configuration of FIG. 2B will be maintained, even if minor disturbances (e.g., vibration) are applied to the accessory 200. Positive torque on the accessory 200 about the axis 226 may be required to unlatch the accessory 200 from the device 202 (e.g., 1-3 Nm of user-applied torque may be required to shear the applicable ones of the magnets 220, 222, 224, 228 apart). Such positive torque is applied by a user when the user's intent is to unlatch the accessory 200 from the device 202.

The natural bias to the latched configuration of FIG. 2B allows the user to attach the accessory 200 to the device 202 easily, without any tools or specific training, and without necessarily looking at the accessory 100 (e.g., if the first part 206 is on a backside of the device 202). The user may also easily unlatch the accessory 200 from the device 202 by merely twisting the accessory 200, also without any tools or specific training, and without necessarily looking at the accessory 200. The magnetic bias in the unlatched configuration may provide a positive ejection action when the user twists the accessory 200.

While 0-degree and 180-degree rotations of the second part 204 with reference to the first part 206 are discussed above with specificity, orientations between 0-degrees and 180-degrees are envisioned herein to provide varying levels of attracting and repelling forces, with a 90-degree orientation serving as a cross-over point where the balance of forces applied by the magnets 220, 222, 224, 228 are substantially neutral (i.e., neither attracting nor repelling). Similarly, orientations between 180-degrees and 360-degrees are envisioned herein to provide varying levels of attracting and repelling forces, with a 270-degree orientation serving as another cross-over point where the balance of forces applied by the magnets 220, 222, 224, 228 are substantially neutral (i.e., neither attracting nor repelling).

In some implementations, the second and first parts 204, 206 may collectively serve as an electrical connector. For example, the magnets 222, 224 may be electrically isolated (e.g., by a thin insulating layer 230 therebetween) and serving as electrical contacts that are electrically disconnected in the unlatched configuration. The magnet 220 and/or device 202 chassis at the bottom of the cylindrical recess 212 may be electrically conductive. When the second part 204 is seated within the first part 206, the magnets 222, 224 make electrically conductive contact with the magnet 220 and/or device 202 chassis at the bottom of the cylindrical recess 212, thereby electrically connecting the magnets 222, 224 and connecting a circuit that flows through the magnets 222, 224. Example applications of the electrical connector include an electrically powered indicator (e.g., an indicator light) of a successful latched connection, power supplied to the accessory 200 via the device 202, or vice versa, and so on.

The protrusion magnets 222, 224 are embedded side-by-side within the second part 204 and may each have a rectangular, circular, or semi-circular cross-section shape, as examples, in the x-y plane. In some implementations, only one of the protrusion magnets 222, 224 is included within the second part 204 if only one of a bias toward an unlatched or latched configuration, respectively, is desired. The recess magnet 220 is embedded within the device 202 housing and may also have any convenient cross-section shape in the x-y plane. The catch magnet 228 is embedded within the catch 216 and may also have any convenient cross-section shape in the x-y plane. In another implementation, the depicted polarities of all of the recess magnet 220, the protrusion magnets 222, 224, and the catch magnet 228 are reversed and similar latching/unlatching effects to that described above is achieved.

In various implementations, all of the magnets 220, 222, 224, 228 are made of a magnetically "hard" ferromagnetic material, such as alnico or processed ferrite. Further, both the barb 210 and the catch 216 incorporate a self-centering feature illustrated as matching chamfers. These features aid the user is aligning the accessory 200 with the cylindrical recess and fully seating the second part 204 within the first part 206. Still further, the latching connector 208 may achieve a consistent actuation torque for different users of the device 202 and accessory 200 at different points in time over a life of the device 202 and accessory 200. Consistent actuation torque is defined herein as requiring less than a 10% variation in torque applied to the accessory 200 to latch/unlatch the accessory 200 over time, for example.

In various implementations, one or both of the second part 204 and the first part 206 of the latching connector 208 is sealed to meet IPX5 or IPX6 in solid particle protection and/or IPX7 or IPX8 in in liquid ingress protection around and through the various components of the latching connector 208. For example, the various components of the latching connector 208 may include plastic or rubber overmolding or gaskets therebetween to seal the second part 204 and/or the first part 206. Such sealing is technically advantageous as it prevents the latching connector 208 from affecting an overall desired sealing capacity of the device 202 and/or accessory 200. As compared to traditional turn-lock fastener with an over-centre design that are 15 mm or greater in diameter, the latching connector 208 may be less than 10 mm (or 6-7 mm) in diameter (d).

Figure 3A:
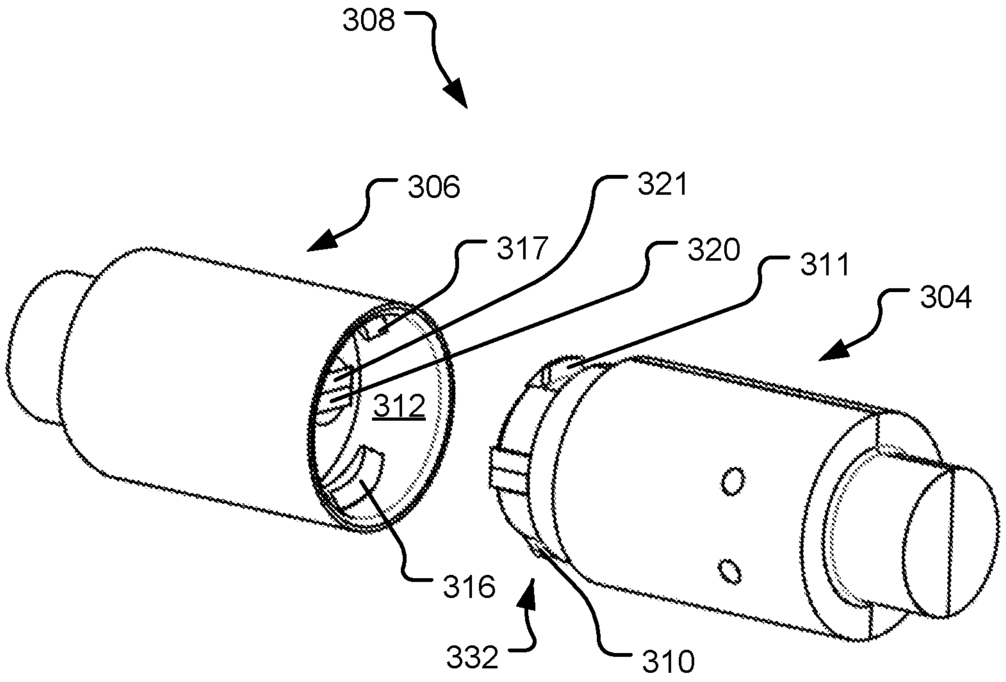
FIG. 3A illustrates a perspective view of an example round magnetically latching connector in an unlatched configuration.
Figure 3B:
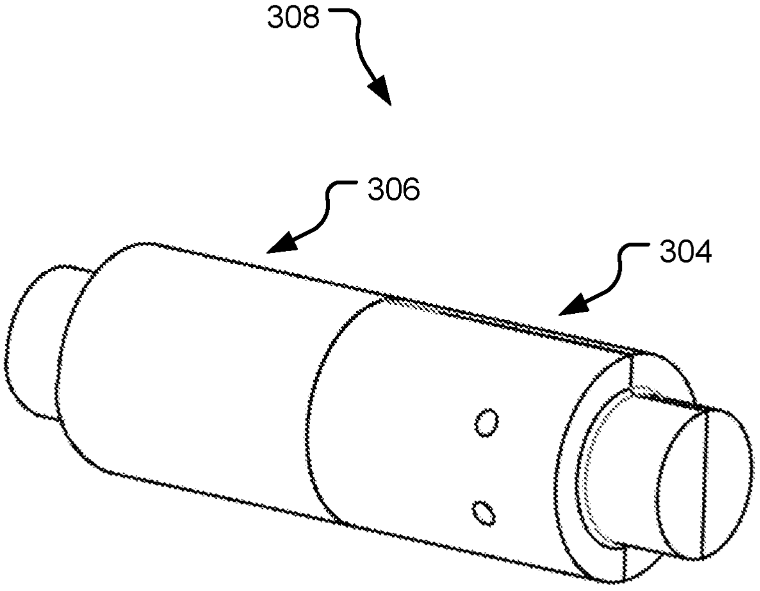
FIG. 3B illustrates a perspective view of the latching connector of FIG. 3A in a latched configuration.

FIG. 3A illustrates a perspective view of an example round magnetically latching connector 308 in an unlatched configuration. FIG. 3B illustrates a perspective view of the latching connector 308 of FIG. 3A in a latched configuration. The latching connector 308 is illustrated in an unlatched and separated configuration in FIG. 3A. By inserting second part 304 (e.g., a male part) into first part 306 (e.g., a female part), the latching connector 308 is placed and secured in the latched configuration of FIG. 3B. Each of the parts 304, 306 are partial views of two parts of an accessory, such as a handle or other accessory, to be selectively connected together. In an example implementation, the parts 304, 306 form two ends of a bracelet, necklace, belt, or other accessory that are designed to be selectively connected to form a continuous loop, particularly around another structure, such as a human body part (e.g., a wrist, neck, or waist).

The connector 308 is made up of the second part 304 and the first part 306, each protruding from opposing distal ends of an accessory. The first part 306 includes a cylindrical recess 312 with opposing catches 316, 317 projecting into the cylindrical recess 312. A pair of recess magnets 320, 321 are fixed in position at a base of the cylindrical recess 312 to provide an over-centre effect using magnetic bias, as discussed in further detail below. The second part 304 includes a cylindrical protrusion 332 to selectively slip fit inside of the cylindrical recess 312. The cylindrical protrusion 332 includes opposing spring-loaded barbs 310, 311 that engage the catches 316, 317, respectively, in the latched configuration of FIG. 3B when the second part 304 is inserted into first part 306. The barbs 310, 311 disengage the catches 316, 317 in the unlatched configuration of FIG. 3A, where second part 304 is free to be withdrawn from the first part 306.

Protrusion magnets (not shown, see e.g., protrusion magnets 422, 424 of FIGS. 4A and 4B) are fixed in position within the cylindrical protrusion 332 and have pole orientations that pull the second part 304 toward the first part 306 in the latched configuration and push the second part 304 away from the first part 306 in the unlatched configuration, thereby selectively latching and unlatching the second part 304 from the first part 306 based on the orientation of the second part 304 with reference to the first part 306.

Figure 4A:
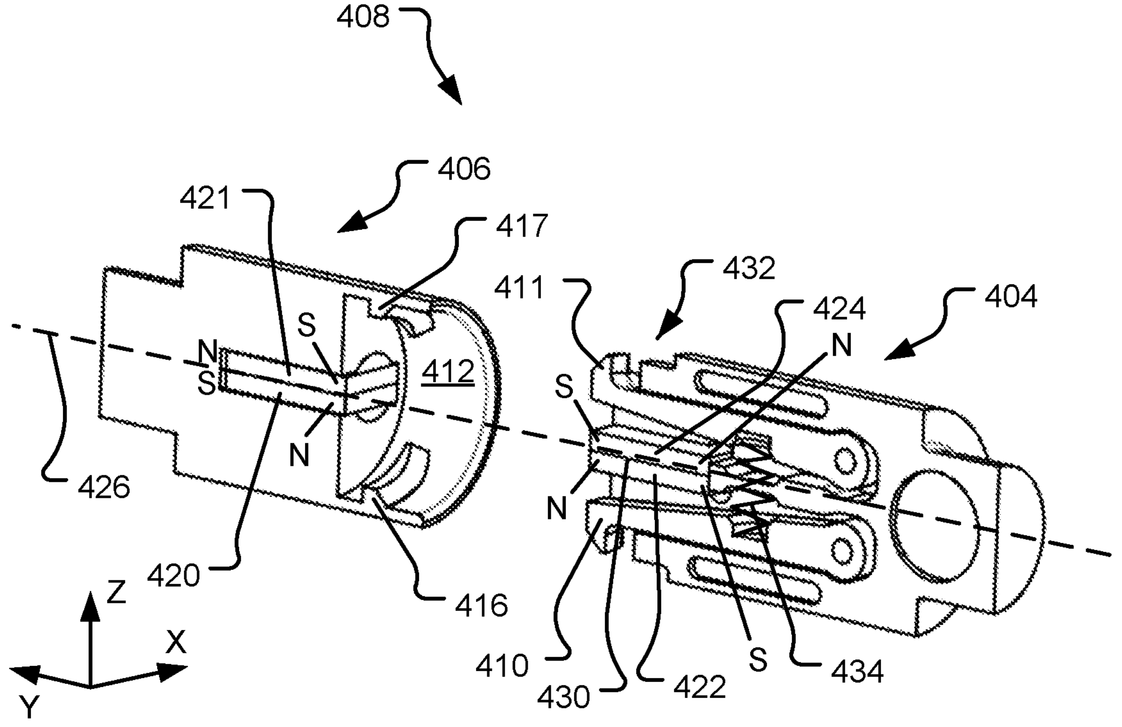
FIG. 4A illustrates a perspective sectional view of an example round magnetically latching connector in an unlatched configuration.
Figure 4B:
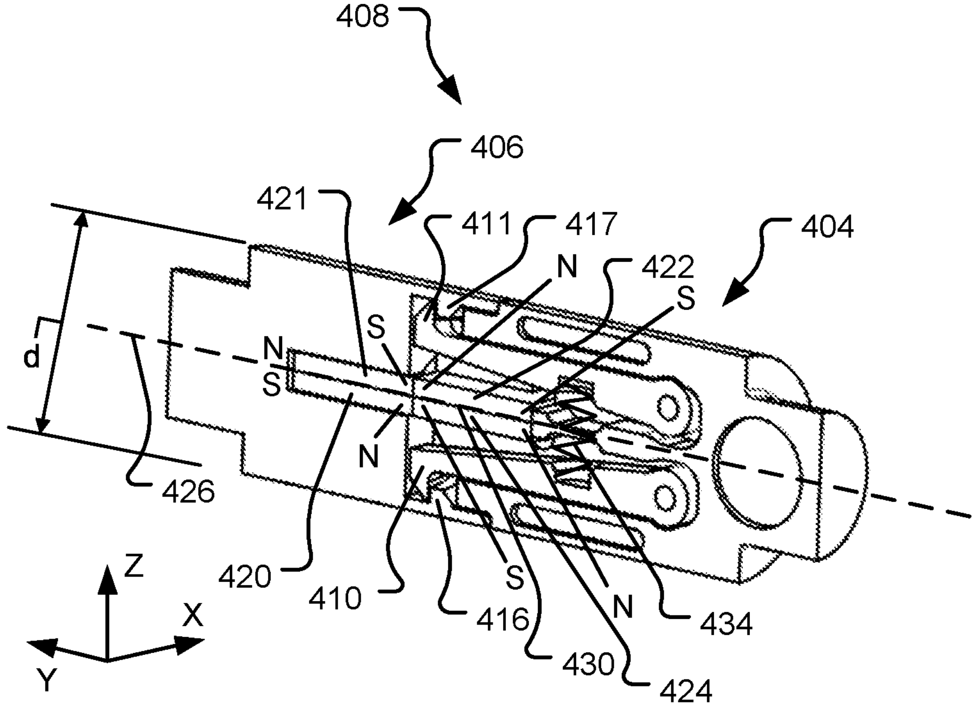
FIG. 4B illustrates a perspective sectional view of the latching connector of FIG. 4A in a latched configuration.

FIG. 4A illustrates a perspective sectional view of an example round magnetically latching connector 408 in an unlatched configuration. FIG. 4B illustrates a perspective sectional view of the latching connector 408 of FIG. 4A in a latched configuration. The latching connector 408 is illustrated in an unlatched and separated configuration in FIG. 4A. By inserting second part 404 (e.g., a male part) into first part 406 (e.g., a female part), the latching connector 408 is placed and secured in the latched configuration of FIG. 4B. Each of the parts 404, 406 are partial views of two parts of an accessory, such as a handle or other accessory, to be selectively connected together. In an example implementation, the parts 404, 406 form two ends of a bracelet, necklace, belt, or other accessory that are designed to be selectively connected to form a continuous loop, particularly around another structure, such as a human body part (e.g., a wrist, neck, or waist). XYZ coordinates are provided in FIGS. 4A and 4B to aid the detailed description, but do not limit the scope of the presently disclosed technology.

The first part 406 includes a cylindrical recess 412 and a pair of opposing fixed catches 416, 417 that each extend radially around a portion of the cylindrical recess 412. The radial orientation of the fixed catches 416, 417 may be technically advantageous in that the fixed catches 416, 417 allow the first part 406 to be attached to the second part 404, but still permit rotation of the first part 406 with reference to the second part 404. The amount of the 360-degree inner circumference of the cylindrical recess 412 varies depending upon the implementation but may range from 15-degrees to 135-degrees for each of the fixed catches 416, 417, for example. The length of the fixed catches 416, 417 at least in part defines the rotation of the second part 404 with reference to the first part 406 required to move from the latched configuration of FIG. 4B to the unlatched configuration of FIG. 4A. For example, for fixed catches 416, 417 that each occupy 45-degrees of the inner circumference of the cylindrical recess 412, a 45-degree rotation of the second part 404 with reference to the first part 406 may be required to unlatch the latching connector 408. Similarly, for fixed catches 416, 417 that each occupy 15-degrees of the inner circumference of the cylindrical recess 412, a 15-degree rotation of the second part 404 with reference to the first part 406 may be required to unlatch the latching connector 408. Partial rotations (e.g., 15-degrees, 45-degrees, or other angular rotations) to latch and unlatch the latching connector 408 is technically advantageous in that it is easier and faster for a user to operate the latching connector 408 than other connectors that require one or more full rotations (e.g., screwed connections) to latch and unlatch.

A pair of recess magnets 420, 421 arranged side-by-side and having opposite polarities are fixed in position at a base of the cylindrical recess 412 to provide the aforementioned over-centre effect using magnetic bias, as discussed in further detail below. The second part 404 includes a cylindrical protrusion 432 that selectively slip fits inside of the cylindrical recess 412. The cylindrical protrusion 432 includes a pair of resiliently deflectable barbs 410, 411, each of which extend from an interior of the second part 404 generally in the y-direction and are biased radially outward from center axis 426 via biasing spring 434 but are resiliently deflectable radially inward toward the center axis 426 by compressing the spring 434. In other implementation, the material construction of the barbs 410, 411 themselves (e.g., plastic or spring steel) provides the resilient deflection without use of the separate spring 434. Use of the material construction of the barbs 410, 411 themselves in place of the separate spring 434 may be technically advantageous in that it permits a simplified overall device construction, and perhaps fewer potential points of failure thereto. In contrast, use of the spring 434 may be technically advantageous in that it permits deflection of the barbs 410, 411 without bending the barbs 410, 411 themselves, which may result in better performance and longer life of the overall device.

The barbs 410, 411 engage the catches 416, 417, respectively, in the latched configuration of FIG. 2B when the second 404 part is inserted into first 406 part. By rotating the second part 404 with reference to the first part 406, the barbs 410, 411 disengage the catches 416, 417, respectively, in an unlatched configuration where the second part 404 is free to be withdrawn from the first part 406. Third, fourth, etc. catches and associated barbs may be included in further implementations.

Protrusion magnets 422, 424 are arranged side-by-side and having opposite polarities are fixed in position within the cylindrical protrusion 432. Protrusion magnet 424 and recess magnet 420 each have a north-south polarity as depicted, wherein the south pole of the protrusion magnet 424 attracts the north pole of the recess magnet 420 at the depicted rotational orientation of the second part 404 with reference to the first part 406 about axis 426 running in the y-direction of FIG. 4B. Similarly, the north pole of the protrusion magnet 422 attracts the south pole of the recess magnet 421 at the depicted rotational orientation of the second part 404 with reference to the first part 406 about axis 426 running in the y-direction of FIG. 4B. This rotational orientation aligns opposing poles of the pair of recess magnets 420, 421 and the pair of protrusion magnets 422, 424, which pulls the second part 404 inward to seat within the first part 406 and provides a sustained force to hold that position, yielding a bias toward the latched configuration specifically shown in FIG. 4B. This is technically advantageous in that it aids a user in achieving the latched configuration without requiring the user to apply torque to the second part 404 with reference to the first part 406.

If the second part 404 is rotated 180-degrees about the axis 426 from the depicted rotational orientation of FIG. 4B (yielding the orientation of FIG. 4A), the north pole of the protrusion magnet 422 repels the north pole of the recess magnet 420 and the south pole of the protrusion magnet 424 repels the south pole of the recess magnet 421. This rotational orientation misaligns opposing poles of the pair of recess magnets 420, 421 and the pair of protrusion magnets 422, 424, which pushes the second part 404 outward from the first part 406 and provides a sustained force to resist seating the second part 404 within the first part 406, yielding a bias toward the unlatched configuration specifically shown in FIG. 4A. This allows the parts 404, 406 of the accessory to be selectively connected together based on the orientation of the second part 404 with reference to the first part 406.

The magnets 420, 421, 422, 424 may each have a rectangular, circular, or semi-circular cross-section shape in the x-z plane. In some implementations, only one of the protrusion magnets 422, 424 is included within the cylindrical protrusion 432 and only one of the recess magnets 420, 421 is included within the cylindrical recess 412 if only one of a bias toward an unlatched or latched configuration, respectively, is desired. In another implementation, the depicted polarities of all of the magnets 420, 421, 422, 424 are reversed and similar latching/unlatching effects to that described above is achieved.

As magnets naturally bias to an orientation where opposing poles are pulled together, the parts 404, 406 of the accessory are biased to achieve and hold the latched configuration of FIG. 2B when the cylindrical protrusion 432 is brought in close proximity to the cylindrical recess 412 (thus, no user application of torque is required to achieve and hold the latched configuration). Absent user input, the latched configuration of FIG. 4B will be maintained, even if minor disturbances (e.g., vibration) are applied to the accessory. Positive torque on the latching connector 408 about the axis 426 may be required to unlatch the parts 404, 406 (e.g., 1-3 Nm of user-applied torque may be required to shear the magnets 420, 421, 422, 424 apart). Such positive torque is applied by a user when the user's intent is to unlatch the latching connector 408 of the accessory.

The natural bias to the latched configuration of FIG. 2B allows the user to latch the parts 404, 406 easily, without any tools or specific training, and without necessarily looking at the accessory. The user may also easily unlatch the accessory parts 404, 406 by merely twisting one of the parts 404, 406 with reference to the other, also without any tools or specific training, and without necessarily looking at the accessory. The magnetic bias in the unlatched configuration may provide a positive ejection action when the user twists one of the parts 404, 406 with reference to the other.

While 0-degree and 180-degree rotations of the second part 404 with reference to the first part 406 are discussed above with specificity, orientations between 0-degrees and 180-degrees are envisioned herein to provide varying levels of attracting and repelling forces, with a 90-degree orientation serving as a cross-over point where the balance of forces applied by the magnets 420, 421, 422, 424 are substantially neutral (i.e., neither attracting nor repelling). Similarly, orientations between 180-degrees and 360-degrees are envisioned herein to provide varying levels of attracting and repelling forces, with a 270-degree orientation serving as another cross-over point where the balance of forces applied by the magnets 420, 421, 422, 424 are substantially neutral (i.e., neither attracting nor repelling).

In some implementations, the second and first parts 404, 406 may collectively serve as an electrical connector. For example, the magnets 422, 424 within the cylindrical protrusion 432 may be electrically isolated (e.g., by a thin insulating layer 430 therebetween) and serving as electrical contacts that are electrically disconnected in the unlatched configuration. The magnets 420, 421 at the bottom of the cylindrical recess 412 may be electrically conductive and lacking an insulating layer therebetween. When the second part 404 is seated within the first part 406, the magnets 422, 424 make electrically conductive contact with the magnets 420, 421 at the bottom of the cylindrical recess 412, thereby electrically connecting the magnets 422, 424 and connecting a circuit that flows through the magnets 422, 424.

In another example implementation, a similar connection could be made if the magnets 420, 421 at the bottom of the cylindrical recess 412 are electrically isolated (e.g., by a thin insulating layer therebetween) and serve as electrical contacts that are electrically disconnected in the unlatched configuration. The magnets 422, 424 within the cylindrical protrusion 432 may be electrically conductive and lacking an insulating layer therebetween. When the second part 404 is seated within the first part 406, the magnets 422, 424 make electrically conductive contact with the magnets 420, 421 at the bottom of the cylindrical recess 412, thereby electrically connecting the magnets 420, 421 and connecting a circuit that flows through the magnets 420, 421.

In a still further example implementation, the magnets 420, 421 and magnets 422, 424 are electrically isolated. The magnets 420, 424 and magnets 421, 422 are matched pairs of electrical contacts that are electrically disconnected in the unlatched configuration. When the second part 404 is seated within the first part 406, the magnets 422, 424 make electrically conductive contact with the magnets 420, 421, respectively, at the bottom of the cylindrical recess 412, thereby separately electrically connecting the magnets 420, 424 and the magnets 421, 422 and connecting two circuits that flows through the matched pairs of electrical contacts created by the magnets 420, 421, 422, 424.

In various implementations, all of the magnets 420, 421, 422, 424 are made of a magnetically "hard" ferromagnetic material, such as alnico or processed ferrite. Further, both the barbs 410, 411 and the catches 416, 417 incorporate a self-centering feature illustrated as matching chamfers. These features aid the user is aligning the cylindrical protrusion 432 with the cylindrical recess 412 and fully seating the second part 404 within the first part 406. Still further, the latching connector 408 may achieve a consistent actuation torque for different users of the accessory at different points in time over a life of the accessory. Consistent actuation torque is defined herein as requiring less than a 10% variation in torque applied to the accessory to latch/unlatch the latching connector 408 over time, for example.

In various implementations, one or both of the second part 404 and the first part 406 of the latching connector 408 is sealed to meet IPX5 or IPX6 in solid particle protection and/or IPX7 or IPX8 in in liquid ingress protection around and through the various components of the latching connector 408. Such sealing is technically advantageous as it prevents the latching connector 408 from affecting an overall desired sealing capacity of the accessory. As compared to traditional turn-lock fastener with an over-centre design that are 15 mm or greater in diameter, the latching connector 208 may be less than 10 mm (or 6-7 mm) in diameter (d).

In other implementations, features illustrated and described above with reference to FIGS. 1-4 may be used in different combinations than that explicitly shown in each of FIGS. 1-4 and described with specific reference to each of FIGS. 1-4.

Figure 5:
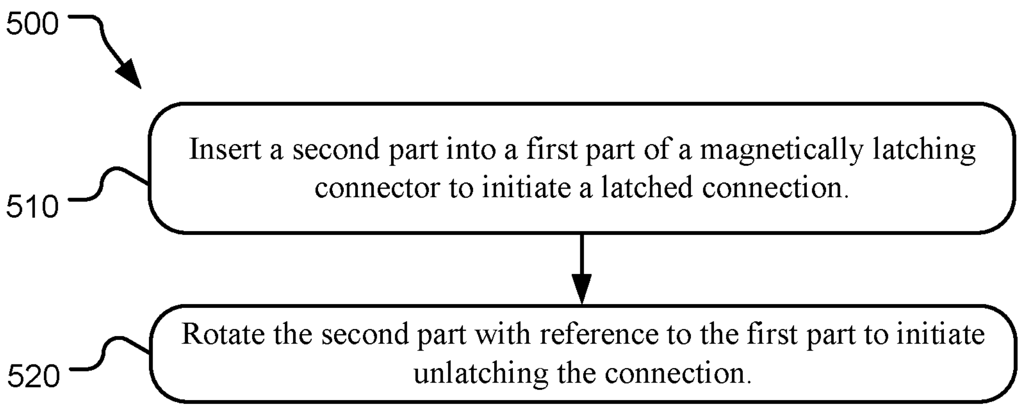
FIG. 5 illustrates example operations for latching and unlatching a magnetically latching connector.

FIG. 5 illustrates example operations 500 for latching and unlatching a magnetically latching connector. In an inserting operation 510, a user inserts a second part (e.g., a male part) into a first part (e.g., a female part) of the magnetically latching connector. Magnetic bias pulls the second part into the first part and biases to a rotational orientation of the second part to the first part where the magnetically latching connector maintains a latched connection.

In a rotating operation 520, a user rotates the second part with reference to the first part to initiate unlatching the connection. The rotating operation 520 reduces or reverses the magnetic attraction between the second part and the first part and disengages one or more barbs from associated catches within the magnetically latching connector to allow the connection to be unlatched.

Some example implementations of the presently disclosed magnetically latching connector comprises a first part and a second part. The first part includes a cylindrical recess, the cylindrical recess including a catch projecting into the cylindrical recess; and a recess magnet fixed in position at a base of the cylindrical recess. The second part includes a cylindrical protrusion to selectively slip fit inside of the cylindrical recess, the cylindrical protrusion including a barb, the barb to engage the catch in a latched configuration of the second part with reference to the first part, the barb to disengage the catch in unlatched configuration of the second part with reference to the first part; and a protrusion magnet fixed in position within the cylindrical protrusion. The latched configuration aligns opposing poles of the recess magnet and the protrusion magnet. The unlatched configuration misaligns the opposing poles of the recess magnet and the protrusion magnet.

In some implementations of the presently disclosed technology, the second part is rotated at least 45-degrees with reference to the first part to move the magnetically latching connector from the latched configuration to the unlatched configuration.

In some implementations of the presently disclosed technology, the protrusion magnet and the recess magnet serve as electrical contacts that are electrically connected in the latched configuration and electrically disconnected in the unlatched configuration.

In some implementations of the presently disclosed technology, the second part includes a pair of protrusion magnets fixed in position within the cylindrical protrusion, the pair of protrusion magnets each having opposite polarities.

Some implementations of the presently disclosed technology have a diameter less than 10 mm.

Some example implementations of the presently disclosed magnetically latching connector comprises a first part and a second part. The first part includes a cylindrical recess, the cylindrical recess including a fixed catch projecting into and extending radially around a portion of the cylindrical recess; and a pair of recess magnets fixed in position at a base of the cylindrical recess, the pair of recess magnets having opposite polarities. The second part includes a cylindrical protrusion to selectively slip fit inside of the cylindrical recess, the cylindrical protrusion including a resiliently deflectable barb, the barb to engage the fixed catch in a latched configuration of the second part with reference to the first part, the barb to disengage the fixed catch in an unlatched configuration of the second part with reference to the first part; and a pair of protrusion magnets fixed in position within the cylindrical protrusion, the pair of protrusion magnets each having opposite polarities. The latched configuration aligns opposing poles of the pair of recess magnets and the pair of protrusion magnets. The unlatched configuration misaligns the opposing poles of the pair of recess magnets and the pair of protrusion magnets.

In some implementations of the presently disclosed technology, the second part is rotated at least 45-degrees with reference to the first part to move the magnetically latching connector from the latched configuration to the unlatched configuration.

In some implementations of the presently disclosed technology, the second part further includes a biasing spring, wherein the biasing spring provides resilient deflection of the barb and biases the barb radially outward.

In some implementations of the presently disclosed technology, a material construction of the barb provides resilient deflection of the barb and biases the barb radially outward.

In some implementations of the presently disclosed technology, the cylindrical recess further includes a second fixed catch opposing the fixed catch, the second fixed catch also projecting into and extending radially around a portion of the cylindrical recess, wherein the cylindrical protrusion further includes a second resiliently deflectable barb opposing the resiliently deflectable barb, the second resiliently deflectable barb to engage the second fixed catch in the latched configuration, the second resiliently deflectable barb to disengage the second fixed catch in the unlatched configuration.

In some implementations of the presently disclosed technology, the pair of protrusion magnets serve as electrical contacts that are electrically connected in the latched configuration and electrically disconnected in the unlatched configuration.

In some implementations of the presently disclosed technology, the pair of recess magnets serve as electrical contacts that are electrically connected in the latched configuration and electrically disconnected in the unlatched configuration.

In some implementations of the presently disclosed technology, a first one of the recess magnets and a first one of the protrusion magnets serve as a first matched pair of electrical contacts, and a second one of the recess magnets and a second one of the protrusion magnets serve as a second matched pair of electrical contacts, the first and second matched pairs of electrical contacts electrically connected in the latched configuration and electrically disconnected in the unlatched configuration.

Some implementations of the presently disclosed technology have a diameter less than 10 mm.

Some example implementations of the presently disclosed magnetically latching connector comprises a first part and a second part. The first part includes a cylindrical recess, the cylindrical recess including a retractable catch selectively projecting into the cylindrical recess; and a recess magnet fixed in position at a base of the cylindrical recess. The second part includes a cylindrical protrusion to selectively slip fit inside of the cylindrical recess, the cylindrical protrusion including a barb extending circumferentially around a distal end of the cylindrical protrusion, the barb to engage the retractable catch when the retractable catch is extended in a latched configuration, the barb to disengage the retractable catch when the retractable catch is retracted in an unlatched configuration; and a pair of protrusion magnets fixed in position within the cylindrical protrusion, the pair of protrusion magnets having opposite polarities. The latched configuration aligns opposing poles of the recess magnet and one of the protrusion magnets. The unlatched configuration misaligns the opposing poles of the recess magnet and the one of the protrusion magnets.

In some implementations of the presently disclosed technology, the second part is rotated at least 45-degrees with reference to the first part to move the magnetically latching connector from the latched configuration to the unlatched configuration.

In some implementations of the presently disclosed technology, the pair of protrusion magnets serve as electrical contacts that are electrically connected in the latched configuration and electrically disconnected in the unlatched configuration.

In some implementations of the presently disclosed technology, the retractable catch includes a catch magnet, wherein the catch magnet is attracted to one of the pair of protrusion magnets in the latched configuration and repelled from the other of the protrusion magnets in the unlatched configuration.

In some implementations of the presently disclosed technology, each of the protrusion magnets and the recess magnet are of a magnetically "hard" ferromagnetic material.

Some implementations of the presently disclosed technology have a diameter less than 10 mm.

The operations making up the embodiments of the invention described herein are referred to variously as operations, steps, objects, or modules. Furthermore, the operations may be performed in any order, adding or omitting operations as desired, unless explicitly claimed otherwise or a specific order is inherently necessitated by the claim language.

In various implementations, the dimensions provided herein are approximate and defined as +/−10%. Dimensions provided herein and described as "substantially" is defined as within expected manufacturing tolerances for the disclosed art. In other implementations (e.g., large travel push buttons), the provided dimensions may have proportionally greater values than that specifically defined. Further, other dimensions than those specifically provided are contemplated herein.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A magnetically latching connector comprising:
a first part including:
  a cylindrical recess, the cylindrical recess including a retractable catch projecting into the cylindrical recess; and
  a recess magnet fixed in position at a base of the cylindrical recess;
a second part including:
  a cylindrical protrusion to selectively slip fit inside of the cylindrical recess, the cylindrical protrusion including a barb, the barb to engage the retractable catch in a latched configuration of the second part with reference to the first part, the barb to disengage the retractable catch in an unlatched configuration of the second part with reference to the first part; and
  a protrusion magnet fixed in position within the cylindrical protrusion, wherein:
  the latched configuration aligns opposing poles of the recess magnet and the protrusion magnet, and
  the unlatched configuration misaligns the opposing poles of the recess magnet and the protrusion magnet, wherein the retractable catch includes a catch magnet, wherein the catch magnet is attracted to the protrusion magnet in the latched configuration and repelled from the protrusion magnet in the unlatched configuration.

2. The magnetically latching connector of claim 1, wherein the second part is rotated at least 45-degrees with reference to the first part to move the magnetically latching connector from the latched configuration to the unlatched configuration.

3. The magnetically latching connector of claim 1, wherein the protrusion magnet and the recess magnet serve as electrical contacts that are electrically connected in the latched configuration and electrically disconnected in the unlatched configuration.

4. The magnetically latching connector of claim 1, wherein the second part includes a pair of protrusion magnets fixed in position within the cylindrical protrusion, the pair of protrusion magnets each having opposite polarities.

5. The magnetically latching connector of claim 1 having a diameter less than 10 mm.

6. A magnetically latching connector comprising:
a first part including:
  a cylindrical recess, the cylindrical recess including first and second fixed catch catches projecting into and extending radially around a portion of the cylindrical recess, the second fixed catch opposing the first fixed catch; and
  a pair of recess magnets fixed in position at a base of the cylindrical recess, the pair of recess magnets having opposite polarities;
a second part including:
  a cylindrical protrusion to selectively slip fit inside of the cylindrical recess, the cylindrical protrusion including first and second resiliently deflectable barbs, the barbs to engage the fixed catches in a latched configuration of the second part with reference to the first part, the barbs to disengage the fixed catches in an unlatched configuration of the second part with reference to the first part, the second barb opposing the first barb; and
  a pair of protrusion magnets fixed in position within the cylindrical protrusion, the pair of protrusion magnets each having opposite polarities, wherein:
  the latched configuration aligns opposing poles of the pair of recess magnets and the pair of protrusion magnets, and the unlatched configuration misaligns the opposing poles of the pair of recess magnets and the pair of protrusion magnets.

7. The magnetically latching connector of claim 6, wherein the second part is rotated at least 45-degrees with reference to the first part to move the magnetically latching connector from the latched configuration to the unlatched configuration.

8. The magnetically latching connector of claim 6, wherein the second part further includes a biasing spring, wherein the biasing spring provides resilient deflection of the barbs and biases the barbs radially outward.

9. The magnetically latching connector of claim 6, wherein the barbs are biased radially outward.

10. The magnetically latching connector of claim 6, wherein the pair of protrusion magnets serve as electrical contacts that are electrically connected in the latched configuration and electrically disconnected in the unlatched configuration.

11. The magnetically latching connector of claim 6, wherein the pair of recess magnets serve as electrical contacts that are electrically connected in the latched configuration and electrically disconnected in the unlatched configuration.

12. The magnetically latching connector of claim 6, wherein a first one of the recess magnets and a first one of the protrusion magnets serve as a first matched pair of electrical contacts, and a second one of the recess magnets and a second one of the protrusion magnets serve as a second matched pair of electrical contacts, the first and second matched pairs of electrical contacts electrically connected in the latched configuration and electrically disconnected in the unlatched configuration.

13. The magnetically latching connector of claim 6 having a diameter less than 10 mm.

14. A magnetically latching connector comprising:

a first part including:

a cylindrical recess, the cylindrical recess including a retractable catch selectively projecting into the cylindrical recess; and a recess magnet fixed in position at a base of the cylindrical recess;

a second part including:

a cylindrical protrusion to selectively slip fit inside of the cylindrical recess, the cylindrical protrusion including a barb extending circumferentially around a distal end of the cylindrical protrusion, the barb to engage the retractable catch when the retractable catch is extended in a latched configuration, the barb to disengage the retractable catch when the retractable catch is retracted in an unlatched configuration; and a pair of protrusion magnets fixed in position within the cylindrical protrusion, the pair of protrusion magnets having opposite polarities, wherein:

the latched configuration aligns opposing poles of the recess magnet and one of the protrusion magnets, and the unlatched configuration misaligns the opposing poles of the recess magnet and the one of the protrusion magnets, wherein the retractable catch includes a catch magnet, wherein the catch magnet is attracted to one of the pair of protrusion magnets in the latched configuration and repelled from the other of the protrusion magnets in the unlatched configuration.

15. The magnetically latching connector of claim 14, wherein the second part is rotated at least 45-degrees with reference to the first part to move the magnetically latching connector from the latched configuration to the unlatched configuration.

16. The magnetically latching connector of claim 14, wherein the pair of protrusion magnets serve as electrical contacts that are electrically connected in the latched configuration and electrically disconnected in the unlatched configuration.

17. The magnetically latching connector of claim 14, wherein each of the protrusion magnets and the recess magnet are of a magnetically “hard” ferromagnetic material.

18. The magnetically latching connector of claim 14 having a diameter less than 10 mm.

* * * * *